INVENTOR.
PAUL J. HOLMES
BY
ATTORNEY

United States Patent Office

3,153,351
Patented Oct. 20, 1964

3,153,351
VIBRATING STRING TRANSDUCER DEVICES AND SYSTEMS EMPLOYING THE SAME
Paul J. Holmes, Laguna Beach, Calif., assignor to Borg-Warner Corporation, Chicago, Ill., a corporation of Illinois
Filed Dec. 27, 1957, Ser. No. 705,578
3 Claims. (Cl. 73—497)

This invention relates to vibrating string transducer devices for translation of mechanical forces into electrical effects, and to systems incorporating such devices for the measurement of changes in force. More particularly this invention pertains to accelerometer systems incorporating vibrating string transducer devices.

It has heretofore been proposed to employ a transducer, having a vibratory string or wire under variable stress, as a component of a measuring system such that a change in tensioning force and hence a change in stress of the vibratory string causes a corresponding change in the frequency of vibration thereof. Thus, such a system is able to feasure forces and changes therein by causing force changes to effect corresponding changes in the stress of the string, wherefore, through the use of appropriate meters and other system components, the magnitude of a force or changes therein can be determined merely by reading the frequency or changes in frequency of vibration of the string.

This general mode of operation of vibrating string transducers has been utilized in various specific embodiments to meet the particular requirements of certain specific types of forces. One such utilization of this principle or mode of operation has been in devices for measuring inertia forces such as are encountered in acceleration and deceleration of a given structure. It has been found desirable in providing such accelerometer devices to employ a pair of substantially identical vibratory strings or wires arranged along a common axis and connected to a common mass such that movement of the mass due to change in inertia force thereon causes an increase in the stress of one of the strings and a corresponding decrease in the stress of the other of such strings. The magnitude of such change in inertia can then be determined by noting the change in frequency difference of the several strings. Such an arrangement is set forth in my co-pending application Dual String Force Transducer, Serial No. 660,009, filed May 17, 1957, now abandoned.

However, it has been discovered that transducer devices as above described have certain defects or shortcomings which destroy or impair the accuracy of such measuring systems. Firstly, it has been found that in spite of the fact that the change in stress of the vibratory string can be made to vary linearly and directly with variation in force applied to force responsive means associated with the string, the frequency of vibration of the string does not vary linearly and directly with such variation in stress. Thus the measurement of change in frequency of vibration of the string has not heretofore accurately and precisely reflected the change in force which caused such frequency change, particularly when the system has been used to analyze all force changes throughout a given range thereof.

Also, the accuracy of systems heretofore utilizing vibratory string transducers has been adversely affected by certain outside or extraneous conditions such as temperature variations and the like. These extraneous conditions have caused prior systems to be very unstable in that without application of force on the force responsive element an extraneous condition has so affected the transducer as to cause the system to indicate the presence of a force to be measured.

Systems employing transducers of the dual string type have shown the further shortcoming that the several strings tend to lock together at the same frequency of vibration, or that the entire string-mass system tends to vibrate and lock in with the difference in frequency of vibration of the several strings thus further destroying the necessary precise relationship between the force changes and frequency changes due to the increased force necessary to overcome such locked condition. Also, accelerometer systems employing dual string transducers, as above explained, have been incapable of indicating the direction of the inertia force or, in other words, of indicating whether the inertia force is the result of acceleration or deceleration.

It is therefore an object of the present invention to provide a novel vibrating string transducer device which when incorporated in a measuring system therefor will cause the change in frequency of vibration of the string means of said transducer device to vary linearly and directly with the changes in stress thereof.

Another object is to provide a system for cooperation with the above novel vibrating string transducer device, which system is capable of detecting the degree of nonlinearity between stress change and frequency of vibration change of the string means of the transducer device.

A further object is to provide the above novel transducer means wherein the string means comprises two substantially identical prestressed strings arranged along a common axis and fixed to a common mass, there being means associated with both of said strings to simultaneously vary the stresses thereof to cause changes in frequency difference of said strings to vary linearly and directly with changes in force to be measured.

A further object is top provide a force measuring system comprising a transducer device having a pair of vibratory strings fixed to a common force responsive mass as above described and means for determining the degree of nonlinearity between change in frequency difference of said strings and change in stress difference thereof with change in force on said mass and for causing said transducer to alter the stresses of said strings to eliminate such nonlinearity.

A further object is to provide a force measuring system as above described comprising means for maintaining constant the sum of the vibration frequencies of said strings to thereby cause the frequency difference of said strings to vary linearly and directly with the change in force effecting such change in the frequencies of said strings.

Another object is to provide a force measuring system as above described which is extremely stable at all values of force, including zero force, throughout a given range thereof.

Another object is to provide a force measuring system as above described which is capable of distinguishing between changes in frequency of vibration of the strings as caused by the application of force on said element and changes in frequency as caused by extraneous effects such as changes in temperature and the like.

Another object is to provide a force measuring system as above described which is capable of indicating both magnitude and direction of the force applied to the force responsive element.

Another object is to provide a force measuring system as hereinbefore described wherein the several vibratory strings are less susceptible to vibration locking than in systems heretofore prevalent in the art.

Another object is to provide such a force measuring system wherein the several vibratory strings are caused to vibrate at predetermined different frequencies to thereby preclude vibration locking of such strings at the same frequency and to afford indication of the direction of the force as well as the magnitude thereof as applied to the force responsive element.

The invention consists of the novel constructions, arrangements and devices to be hereinafter described and claimed for carrying out the above stated objects and such other objects as will be apparent from the following description of preferred forms of the invention illustrated with reference to the accompanying drawings, in which:

Like reference characters indicate corresponding parts throughout the several views of the drawings.

Figure 1:
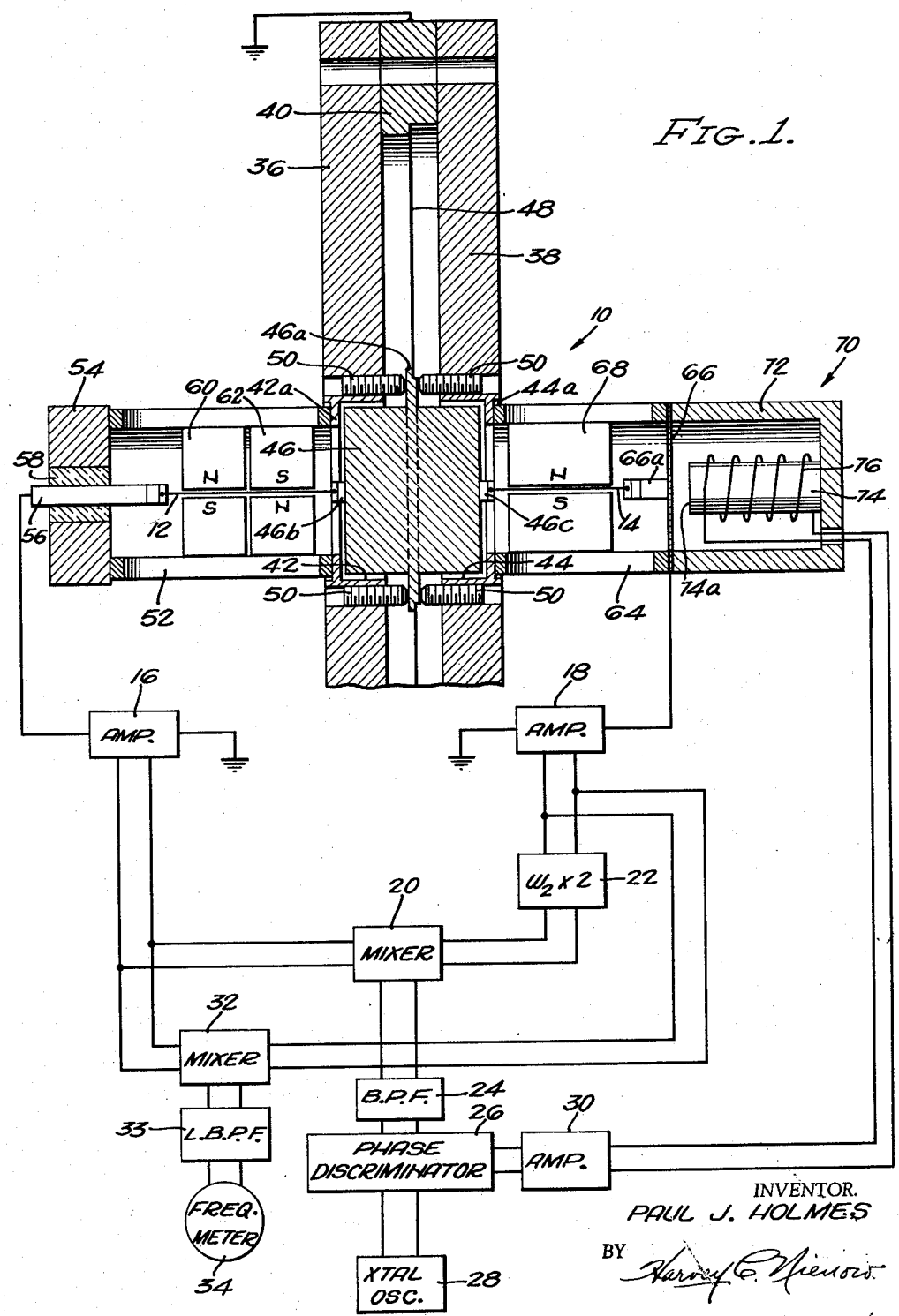
FIGURE 1 is a schematic diagram showing a force measuring system comprising a first embodiment of the novel vibratory string transducer device, the latter being shown in section.

Referring to FIGURE 1 of the drawings, there is shown an accelerometer system comprising a first embodiment 10 of the novel vibrating element transducer device having a pair of substantially identical vibratory electrically-conductive elements or wires 12 and 14. It is contemplated within the scope of this invention that strands 12 and 14 instead of being circular in cross section, may have various cross sectional shapes, such, for example, as ribbon-like or polygonal, and I also contemplate that strings of nonconductive material coated with conductive material may be employed instead of metallic strings. The general arrangement of the accelerometer system has the string 12 connected in circuit with an electronic amplifier 16 and the string 14 connected in circuit with an electronic amplifier 18. The output terminals of amplifier 16 are connected directly to a first set of input terminals of an electronic mixer 20. The output terminals of amplifier 18 are connected to the input terminals of an electronic frequency doubler 22, the output terminals thereof being connected to a second set of input terminals on the electronic mixer 20. Mixer 20 is connected to a band-pass filter 24, the output of the latter being fed to a phase discriminator 26. Also supplying a signal to discriminator 26 is a crystal oscillator 28. The output of phase discriminator 26 is fed back to transducer 10 through an amplifier 30. An electronic mixer 32 is connected to the output terminals of the amplifiers 16 and 18, the output of mixer 32 being fed through a band-pass filter 33 to a frequency meter 34. Each of the aforeindicated electronic circuits is not, in and of itself, new in the art, but rather is well known to those persons skilled in the electronic field, wherefore a detail description of such circuits is deemed undesirable and hence will not be set forth.

Transducer device 10 comprises a housing formed of two circular side plates 36 and 38 spaced from each other by an annular rim 40. The plates 36 and 38 are formed with openings 42 and 44 respectively which are aligned with each other when plates 36 and 38 are assembled to rim 40. Within each of openings 42 and 44 is an annular shoulder 42a and 44a respectively.

A mass or force responsive element 46 is positioned within the openings 42 and 44 between the shoulders 42a and 44a and is connected to strings 12 and 14 as will be hereinafter explained in greater detail. Force responsive element 46 is provided with an annular shoulder 46a to which is attached a thin flexible diaphragm 48 or other similar support means. The outer peripheral edge of diaphragm 48 is fixed to rim 40 to provide frictionless mounting means for retaining mass 46 in free-floating position within the openings 42 and 44 due to the extremely small spring constant of diaphragm 48. Adjustable limit stops 50 formed with fastening threads are positioned within suitable threaded openings in side plates 36 and 38 to provide adjustable means for limiting movement of mass 46.

Fixed to plate 36 in abutting relation with annular shoulder 42a in opening 42 is a wire or string enclosing assembly comprising a housing 52 provided with an end wall 54. A mounting pin 56 is rigidly fixed within end wall 54 by means of an hermetic seal 58. One end of string 12 is fixed to pin 56 while the other end thereof is fixed to a lug 46b on mass 46. Within housing 52 are a pair of U-shaped permanent magnets 60 and 62 each of which has North and South magnetic poles adjacent to but on opposite sides of string 12. Magnets 60 and 62 are so arranged with respect to each other and with respect to string 12 that like magnetic poles are on opposite sides of string 12 as shown in FIGURE 1.

Fixed to plate 38 in abutting relation with annular shoulder 44a within opening 44 is a wire or string enclosing assembly for vibrating string 14. Such assembly comprises a housing 64 provided with an end wall in the form of a magnetically permeable thin flexible diaphragm 66 formed with a fastening lug 66a. Vibrating string 14 has its opposite ends fixed to fastening lug 66a and to a fastening lug 46c on mass 46. A U-shaped magnet 68 is positioned within housing 64 such that the North and South poles thereof are on opposite sides of string 14.

A string stress varying device 70 is fixed to housing 64 adjacent diaphragm 66. In FIGURE 1 such device takes the form of an electromagnetic unit 70 comprising a cup-shaped magnetically permeable enclosure 72 and a magnetically permeable core member 74 having a pole face 74a in magnetic flux conducting relation with diaphragm 66. An electromagnet winding 76 is wound on core member 74 and is provided with leads which extend through an opening provided in enclosure 72.

As explained in my aforementioned co-pending application, Serial No. 660,009 each of the strings 12 and 14 is connected in circuit with its respective amplifier 16 and 18 such that vibration of said strings within the magnetic fields afforded by the permanent magnets associated respectively therewith provides an electrical input to each of the amplifiers 16 and 18, the latter devices affording by means of feedback circuits (not shown) a current flow through the wires to sustain vibration thereof at a natural frequency corresponding to its stress in a manner similar to that shown and described in U.S. Patent No. 2,725,492 to W. H. Allan issued on November 29, 1955. In this manner, each of the amplifiers 16 and 18 provides an output signal corresponding to the frequency of vibration of the respective strings 12 and 14. Since string 12 is provided with twice the number of magnetic fields that are provided for string 14, string 12 will vibrate at approximately twice the frequency of vibration of string 14 when no force is applied to mass 46. That is, due to the fact that mass 46 is free-floating within openings 42 and 44 when no force is applied to mass 46, the same tension is provided on each of the strings 12 and 14. With said strings 12 and 14 of substantially identical length, cross section and composition, their natural frequency of vibration will be identical or direct multiples of each other depending upon the number of magnetic fields traversing each of said wires. Since string 14 is provided with only a single magnetic field, namely that provided by permanent magnet 68, and string 12 is provided with two such magnetic fields, namely those provided by permanent magnets 60 and 62, the string 14 will vibrate at the first mode of the natural frequency of vibration corresponding to the stress of the strings whereas the string 12 will be caused to vibrate at twice the frequency of vibration of string 14 or, in other words, at the second mode of such natural frequency.

Now if the output signals of amplifiers 16 and 18 are fed to the mixer 32, the latter can combine such signals to produce resultant signals which are the various combinations of the outputs of amplifiers 16 and 18. That is, mixer 32 will mix together the outputs of amplifiers 16 and 18 so as to produce not only a resultant signal which is the sum of the amplifier signals, but also a resultant signal which is the difference between such signals. By passing such resultant signals through an appropriate low pass filter 33 only the resultant signal which is the difference between the amplifier signals is passed on to the frequency meter 34. By proper calibration of meter 34, such resultant signal can be caused to indicate zero force when no force is applied to mass 46.

With the aforedescribed arrangement, as mass 46 is moved so as to increase the stress of one of the strings while decreasing the stress of the other, the difference frequency as applied to frequency meter 34 from mixer 32 will change accordingly due to the fact that strings 12 and 14 vibrate in accordance with their respective stresses. That is, in the event a force, such as an inertia force as encountered in acceleration and deceleration, is applied to mass 46 so as to move the same toward the left as viewed in FIGURE 1, the stress of string 12 will decrease linearly and directly with such force while the stress of string 14 will increase linearly and directly with respect thereto. This will cause a corresponding increase in the frequency of the output signal of amplifier 18 and a correspodinng decrease in the frequency of the output signal of amplifier 16. As these signals are then mixed together in mixer 32 and passed on to frequency meter 34, it will be noted that the resultant difference frequency as passed by filter 33 to meter 34 will be somewhat less than such resultant difference frequency which was passed to frequency meter 34 when no acceleration force was applied to mass 46.

In like manner, if such force should be applied to mass 46 such as to increase the stress of string 12 while decreasing that of string 14 it will be readily apparent that the resultant difference frequency applied to frequency meter 34 will increase over that applied to meter 34 when no acceleration force is applied to mass 46 since string 12 which originally vibrated at twice the frequency of string 14 will be caused to vibrate at an even higher frequency while string 14 will be caused to vibrate at an even lower frequency. Thus, by providing means such that one of the wires always vibrates at a higher frequency than the other, a resultant frequency difference will obtain to indicate both magnitude and direction of the force applied to mass 46 as will hereinafter be explained in greater detail.

It has been found, however, that the aforedescribed transducer device and associated circuitry has an obvious operational shortcoming in that the frequencies of vibration of the strings 12 and 14 do not vary linearly with variations in the stresses of such strings. In this regard, it should be noted that the term "directly proportional" as employed herein merely means that as one characteristic increases the other characteristic increases in a certain fixed relationship with respect thereto. Such term, however, does not necessarily connote a straight-line relationship between the several characteristics. To denote this latter relationship, I employ the term "linearly proportional" to indicate that for each and every succesive unit of variation of a characteristic throughout a given range thereof, the other characteristic varies by a fixed amount. Thus, although the stress of a given string can be made to vary linearly proportionally with changes in force applied to a force responsive element, the frequency of vibration of such string does not vary linearly proportionally with such stress variations, but rather merely varies proportionally with respect thereto. The fact that the difference frequency between strings 12 and 14 does not vary linearly proportionally with variations in force applied to member 46 is due, at least in part, to the fact that a given decrease in stress of a vibrating string causes a greater change in the frequency of vibration than an increase in stress of the same magnitude. As will be realized, such difference in the magnitude of frequency variation of the several strings 12 and 14 causes the sum of the frequencies of vibration of such strings to decrease with application of force to mass 46. This is so regardless of the direction of such force on the mass, since in all cases, application of force to mass 46 necessarily causes a decrease in the stress of one of the strings and an increase in the stress of the other. Further, I have found that such lack of linearity can be compensated for in a dual string system by maintaining constant the sum of the frequencies of vibration of the several strings.

In order to maintain constant the sum of the frequencies of vibration of wires 12 and 14, I cause the output of amplifier 18 to be fed through a frequency doubler circuit 22 prior to its being passed on to mixer 20, whereas, the output of amplifier 16, on the other hand, is fed directly to such mixer. In view of this and with no force applied to mass 46, the frequencies of the two input signals to mixer 20 are substantially identical. By causing the output of mixer 20 to be fed through a suitable band-pass filter 24, the input to phase discriminator 26 can be made to equal the sum of the frequency of the output of amplifier 16 plus twice the frequency of the output of amplifier 18.

Also applied to phase discriminator 26 is a constant reference frequency signal which originates in oscillator 28, preferably of the crystal type. The phase discriminator 26 compares the aforedescribed sum frequency as afforded by mixer 20 with the constant frequency output of oscillator 28. Thus, as the sum frequency from mixer 20 varies with application of force to mass 46 as above described, phase discriminator 26 in comparing such sum frequency with the constant frequency output of reference oscillator 28 will provide an error signal at the input terminals of amplifier 30, the magnitude of such error signal being directly proportional to the change in sum frequency output of mixer 20. Amplifier 30 then effects appropriate amplification of the error signal whereupon it is transmitted to electromagnet winding 76 of stress varying means 70 associated with transducer device 10. As will be readily apparent such current flow through winding 76 provides electromagnetic flux flow which in traversing the gap between diaphragm 66 and pole face 74a of core 74 attracts diaphragm 66 toward core 74 by an amount depending upon the electromagnetic strength and hence upon the strength of the error signal. Such force on diaphragm 66 increases the stress of both of the wires 12 and 14 thereby increasing the frequency signal output of amplifiers 16 and 18 until the sum frequency output of mixer 20 is equal to that which prevails when no force is applied to mass 46. Stress varying means 70 always acts, in response to energization of winding 76, to increase the stress in the several strings because application of force to mass 46 always effects a decrease in the sum of the frequencies of vibration of the strings as hereinbefore explained. As will be realized any additional variation in the force applied to mass 46 will cause additional variation in the sum frequency output of mixer 20 and the aforedescribed sequential operation will again be effected to compensate for the additional lack of linearity between stress change and frequency change of strings 12 and 14. As will be readily apparent to those persons skilled in the art, it may be desirable to have oscillator 28 so operable that an error signal is always provided from discriminator 26 even when no force is applied to mass 46 so that stress varying means 70 is always exerting some control over the stress of the strings 12 and 14. I prefer to follow this procedure since it affords stability of the frequencies of vibration of the strings when no force is applied to mass 46. Such stability prevents drifting of the frequencies of vibration, or variation thereof for any reason, thus contributing to the overall accuracy and precision operation of the device under consideration.

With the aforedescribed compensation for the lack of linearity between stress change and frequency change of the several wires, the difference frequency output of mixer 32 as applied to frequency meter 34 through filter 33, will vary linearly and directly with variation in force applied to mass 46. Thus, by providing meter 34 with a dial having suitable indicia, said meter can be made to accurately and precisely indicate the amount of force applied to mass 46 as above explained, and also the direction of such force.

It will be further noted that the aforedescribed system for maintaining constant the sum frequency of the vibrations of several wires automatically effects compensation for stress and frequency changes caused by extraneous conditions such as changes in temperature. For example in the event that either or both of the housings 52 and 64 of strings 12 and 14 should contract due to decrease in temperature thereof, a corresponding change in the stresses of strings 12 and 14 will result. Such change in stress of the wires will effect a corresponding change in the frequencies of vibration of such strings and hence a corresponding decrease in the sum frequency realized at the output terminals of mixer 20. Such decreased sum frequency when compared to the constant frequency output of oscillator 28 will provide an error signal which when amplified and passed through electromagnet winding 76 will increase the stress of both strings 12 and 14 until the sum of the frequencies thereof reaches the predetermined value. In this manner, the novel system forming a part of my present invention compensates for all effects which tend to vary the sum of the frequencies of the several wires regardless of whether such variation is the result of lack of linearity between stress change and frequency change or whether it is caused by outside or extraneous forces. The net effect is that the entire system is stabilized so that a given frequency at meter 34 indicates a given force applied to mass 46. This relationship is not only true throughout a given range of forces, but also at zero force when mass 46 is free-floating.

It will be further noted that since string 12 is caused to operate at substantially twice the frequency of vibration of string 14, the tendency for such wires to lock together in vibration is eliminated or greatly minimized. Further, such arrangement minimizes any tendency of the string-mass to vibrate at the natural frequency and lock together with either or both of the vibrating wires when the difference frequency of the wires is equal to that of the natural frequency of the string mass.

Figure 2:
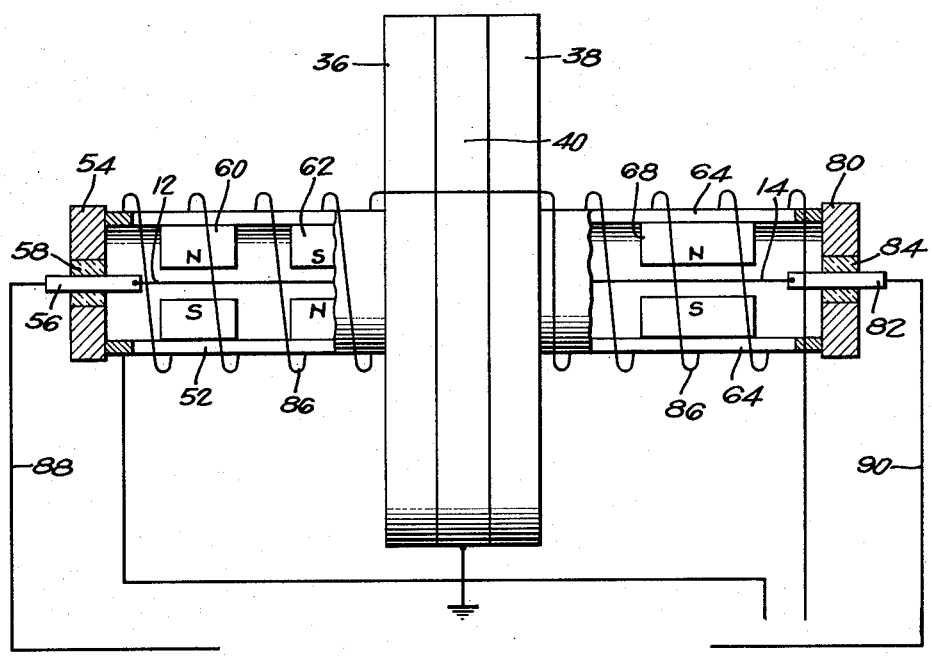
FIGURE 2 is a side elevational view of a second embodiment of the vibratory string transducer device, shown partly in section.

The transducer device of FIGURE 2 is of substantially the same construction as device 10 shown in FIGURE 1, and above described. The device of FIGURE 2, however, has its housing 64 provided with an end wall 80 wherein a mounting pin 82 is fixed by hermetic sealing means 84. The transducer device of FIGURE 2 further differs from such device of FIGURE 1 in that the former employs a coil 86 would about both of the wire enclosing housings 52 and 64 whereas the latter utilizes an electromagnetic structure for simultaneously varying the stress of strings 12 and 14. Coil 86 may be employed as a heating coil for utilization of the I²R heating effect of current flow therethrough or it may be used to provide magnetostrictive effect due to such current flow. In either event, the FIGURE 2 embodiment is connected to the various components of the system of FIGURE 1 such that the lead wire connected to pin 56 is connected to amplifier 16. In like manner, the lead wire having connection with pin 82 of the embodiment shown in FIGURE 2 is connected to amplifier 18 of FIGURE 1. Also, the coil 86 wound about the housings 52 and 64 is connected in circuit with the amplifier 30 of FIGURE 1 so that the error signal afforded by phase discriminator 26 causes current to flow through coil 86 for changing the dimensions of housings 52 and 64 as by heating or magnetostrictive effect, as desired. In either of these manners the housings are caused to expand so that the stresses of strings 12 and 14 are increased to maintain the sum frequency of vibration of strings 12 and 14 constant as aforedescribed with respect to the operation of FIGURE 1.

A preferred embodiment for utilizing I²R heating in changing the stress of the several strings is to cause the output of amplifier 30 to be fed directly and successively through the several strings 12 and 14. In this manner the temperature of the strings will be changed in accordance with the magnitude of the output signal of amplifier 30, thereby causing a corresponding change in the stresses and hence frequencies of vibration of such strings.

It is also contemplated that although a mass 46 is utilized between the strings 12 and 14 for the purpose of changing simultaneously the tensions thereof, any other suitable force applying means, the magnitude of which it is desired to measure, may be used instead for causing a simultaneous increase in the tension of one string and a decrease in the tension of the other as the force increases.

Figure 3:
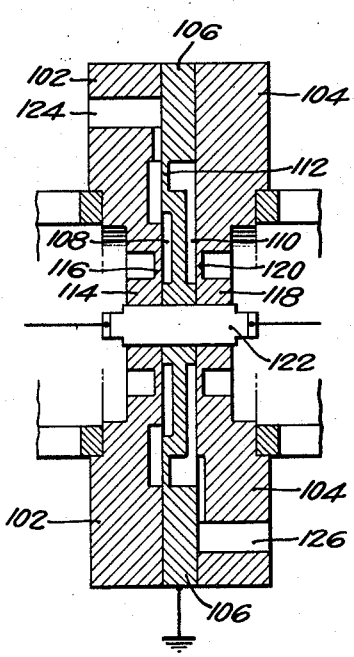
FIGURE 3 is a fragmentary sectional view of a third embodiment of the vibrating string transducer device for incorporation in the inventive system shown in FIGURE 1.

An example of such embodiment using such other force applying means is shown in FIGURE 3. The FIGURE 3 transducer corresponds generally to the form shown in FIGURE 1, and the same electrical circuit may be used in connection therewith, except that this embodiment is designed to measure difference in fluid pressures. The FIGURE 3 embodiment comprises two base plates 102 and 104 and a pressure diaphragm 106 disposed therebetween. The base plate 102 and the pressure diaphragm 106 are provided with an annular cavity 108 cut out of adjacent faces thereof and a cavity 110 is cut out of the diaphragm 106. The outer portions of the cavities are defined by a thin web portion 112 in the diaphragm 106, allowing axial movement of the inner portion of the diaphragm 106 with respect to the outer portion thereof.

The side plate 102 is provided with a hub portion 114 connected with the outer portion of the plate 102 by means of a thin flexible web 116, and the plate 104 is provided with a similar hub 118 connected by means of a flexible web 120 with the outer portion of the plate 104. A pin 122 extends through central openings in the plates 102 and 104 and the diaphragm 106 and is fixed with respect to the hubs 114 and 118 and the central portion of the diaphragm 106. The strings 12 and 14 of the transducer shown in FIGURE 1 are fixed to opposite ends of the pin 122, and the cylindrical housings 52 and 64 are positioned in shoulders formed in the plates 102 and 104.

A fluid supply passage 124 is provided in the base plate 102 and is connected with the cavity 108 to supply fluid thereto, and a passage 126 is provided in the plate 104 connected wtih the cavity 110 for supplying fluid to the latter cavity.

In the FIGURE 3 embodiment fluid under pressure is supplied through either of the passages 124 and 126 to the connected cavities 108 and 110 respectively, or fluid is supplied simultaneously under different pressures to the passages 124 and 126. Fluid under pressure in the cavity 110 causes flexing of the diaphragm 106 in the web portion 112 moving the center portion of the diaphragm 106 to the left as seen in the figure with corresponding movement of the hubs 114 and 118, with corresponding flexing in the web portions 116 and 120 of the plates 102 and 104 respectively. The pin 122 is moved along with these parts to the left as seen in the figure, increasing the tension in string 14 and decreasing the tension in string 12. Fluid under pressure supplied to the cavity 108 without any pressure being supplied to the cavity 110, causes flexing of the web portions 112, 116 and 120 oppositely, with resulting movement of the hubs 114 and 118 and the pin 122 to the right as seen in the figure, causing the string 14 to be decreased in tension and increasing the tension of the string 12. When fluid under different pressures is simultaneously supplied to the cavities 108 and 110, the differential of force on the diaphragm 106 due to these different pressures moves the pin 122 either to the left or to the right depending on which of the pressures is greater causing the same increase and decrease in wire tension with the same flexing actions.

The same electrical components as shown in FIGURE 1 are used with the FIGURE 3 embodiment to measure the difference in frequency of vibration of the strings 12 and 14 in the same manner as with the FIGURE 1 embodiment, and this difference in frequency is indicative of the difference of the fluid pressures applied to the FIGURE 3 transducer. However, should it be determined that the force responsive element, such as diaphragm 106, effectively isolates one string from the other so that stress varying means, such as electromagnetic structure 70 of FIGURE 1, is incapable of varying both of the strings 12 and 14 by the same amount, it may be desirable to employ individual stress changing devices for each of the strings. Such devices may take any one of several forms. In such structure the output of amplifier 30 would be caused to flow successively through the several stress changing devices so that the stress of each of the strings 12 and 14 would be changed by a like amount.

Each of the embodiments shown in the drawings when provided in the system of FIGURE 1, affords means for accurately and precisely indicating the amount of force, such as inertia force and fluid pressure. Such resulting systems also provide means whereby the direction of such force can be readily indicated, and means for minimizing frequency locking of the various strings and the string-mass and for substantially eliminating the effect of external forces.

Although I have shown and described certain specific embodiments of my invention, I am fully aware that many modifications thereof are possible. My invention, therefore, is not to be restricted except insofar as is necessitated by the prior art and by the spirit of the appended claims.

What I claim is:

1. In a force measuring system, the combination of a force responsive element, a pair of prestressed elastic strands, means respectively connecting said strands to said element such that movement of said element due to force thereon causes an increase in the stress of one of said strands and a decrease in the stress of the other of said strands, means for vibrating each of said strands at the natural frequency corresponding to its stress, and means comprising a frequency mixer to effect summation of the frequency of vibration of one of said strands and a multiple of the frequency of the other of said strands, a source of predetermined reference frequency, frequency comparing means having connection with said source and said mixer for providing an error signal proportional to any change in the sum of said frequencies, and means controlled by said error signal to vary accordingly the stresses of said strands to cause said sum to remain constant whereby the difference in the frequencies of vibration of said strands is caused to vary linearly with change in force on said element throughout a given range thereof.

2. In a force measuring system, the combination according to claim 1 wherein the source of reference frequency comprises a crystal oscillator.

3. In a force measuring device, the combination comprising a frame, a movable force responsive element disposed within said frame, a pair of electrically conductive pre-stressed elastic members, means respectively connecting said members to said force responsive element and said frame whereby movement of said element causes an increase in the stress of one of said members and a decrease in the stress of the other of said members, means for vibrating each of said members at the natural frequency thereof corresponding to its stress; first means to effect summation of the frequency of vibration of one of said members and a multiple of the frequency of the other of said members, means responsive to said first means effective to apply heat to at least a portion of said device to increase the tension of said members; second means comparing the frequency of vibration of said members, and means responsive to said second means actuated to indicate changes in the forces applied to said force responsive element.

References Cited in the file of this patent

UNITED STATES PATENTS

| | | |
|---|---|---|
| 2,306,137 | Pabst et al. | Dec. 22, 1942 |
| 2,557,817 | Dutton | June 19, 1951 |
| 2,574,336 | Liberman et al. | Nov. 6, 1951 |
| 2,689,943 | Rieber | Sept. 21, 1954 |
| 2,725,492 | Allan | Nov. 29, 1955 |
| 2,968,943 | Statham | Jan. 24, 1961 |
| 2,969,677 | Lewis | Jan. 31, 1961 |
| 3,002,391 | Holmes | Oct. 3, 1961 |
| 3,057,208 | Bedford | Oct. 9, 1962 |

FOREIGN PATENTS

| | | |
|---|---|---|
| 729,894 | Germany | Dec. 19, 1942 |